US008527460B2

(12) United States Patent
Noble (10) Patent No.: US 8,527,460 B2
(45) Date of Patent: Sep. 3, 2013

(54) METHOD FOR CARRYING OUT DATABASE VERSION CONTROL

(76) Inventor: Jason Laurence Noble, London (GB)

( * ) Notice: Subject to any disclaimer, the term of this patent is extended or adjusted under 35 U.S.C. 154(b) by 526 days.

(21) Appl. No.: 12/709,122

(22) Filed: Feb. 19, 2010

(65) Prior Publication Data

US 2011/0208700 A1  Aug. 25, 2011

(51) Int. Cl.
*G06F 7/00* (2006.01)
(52) U.S. Cl.
USPC .................................. 707/638; 707/625
(58) Field of Classification Search
USPC .......................................................... 707/638
See application file for complete search history.

(56) References Cited

U.S. PATENT DOCUMENTS

| | | | | |
|---|---|---|---|---|
| 6,507,853 B2* | 1/2003 | Bamford et al. | ............. | 707/674 |
| 6,704,737 B1* | 3/2004 | Nixon et al. | ................. | 707/656 |
| 7,735,062 B2* | 6/2010 | de Seabra e Melo et al. | | 717/120 |
| 7,801,861 B2* | 9/2010 | Wong et al. | .................. | 707/659 |
| 7,818,346 B2* | 10/2010 | Layden et al. | ................ | 707/791 |
| 2003/0212647 A1* | 11/2003 | Bangel et al. | ...................... | 707/1 |
| 2005/0149582 A1* | 7/2005 | Wissmann et al. | ........... | 707/201 |
| 2007/0299858 A1* | 12/2007 | Norcott | ......................... | 707/102 |
| 2009/0125478 A1* | 5/2009 | Layden et al. | .................... | 707/2 |
| 2010/0211548 A1* | 8/2010 | Ott et al. | ....................... | 707/655 |
| 2011/0088011 A1* | 4/2011 | Ouali | ............................ | 717/105 |

\* cited by examiner

*Primary Examiner* — Pierre Vital
*Assistant Examiner* — Christopher J Raab
(74) *Attorney, Agent, or Firm* — Blakely, Sokoloff, Taylor & Zafman LLP (57) ABSTRACT

The method carries out version-control of a database in a database environment including a master server storing a database, one or more local servers capable of storing a local copy of the database, and a local machine for the development of the database. When a developer makes a change to the local database on the local machine, a program resident on the local machine derives a script based on the change, and checks the script into the master server. The program executes the script on the master database and stores the script in a metadatabase, which can be accessed by the local servers. When a developer wishes to update a local copy of a database to a particular version, he calls up the program on the local machine, which obtains from the metadatabase those scripts necessary to incrementally change the state of the local copy to the given state.

17 Claims, 9 Drawing Sheets

METHOD FOR CARRYING OUT DATABASE VERSION CONTROL

BACKGROUND OF THE INVENTION

The present invention relates to a method for carrying out version control in the development of databases, in particular, but not exclusively, relational databases.

Various database models are known, including the hierarchical model, the network model and the relational model. The model most commonly used is the relational model.

Figure 1:
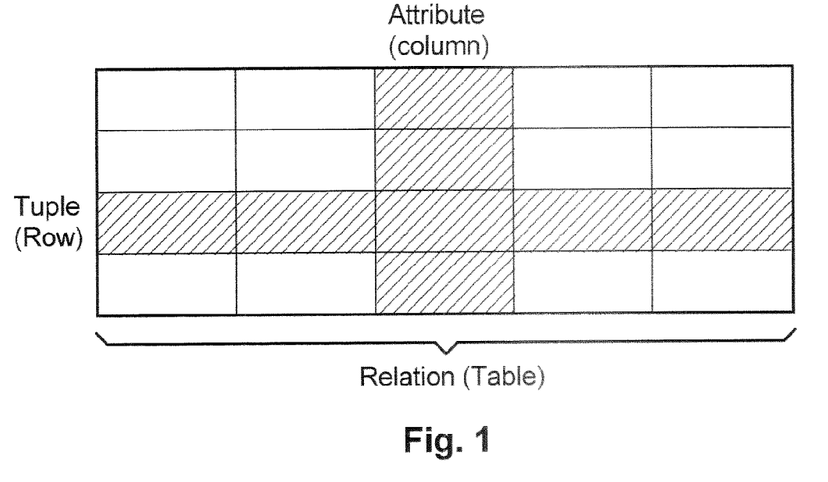
FIG. 1 is a diagram showing the structure of a part of a relational database.

Relational databases are databases in which relationships are identified in the different sets of data making up the database. FIG. 1 shows, in schematic form, a typical relational database structure. A relation defines a set of tuples, which represent an object and information about that object. The various tuples in the relation share the same attribute, and there may be several different attributes in the relation, as shown in the diagram. Stored data is manipulated using a programming language called Structured Query Language, or SQL. SQL is based on set theory, and relational operators such as "and", "or", "not", etc., are used to perform operations on the data. The operations that can be used in a relational database include, e.g., "insert", "select", "update", and "delete" privileges. The relational terms defined above have equivalent names in SQL, namely: "relation"="table", "tuple"="row" and "attribute"="column" in SQL. In addition, the relationships between the various components just described (tables, rows, columns) are commonly designated as the "schema", which relates to the structure of the database. Thus, there are two parts of a database to be defined, namely the schema and the data associated with the schema, and these are both described by SQL language scripts.

It is common practice for a number of developers to be involved in the development of a database. Often the developers will all work on the same master database, which is kept on a master server. Unfortunately, this can create problems, since a first developer can make changes to the master database, which a second developer does not know about. Consequently, the second developer may well work on such a changed master database and find that the changes he makes cannot be committed to the master database, since the changes made by the first developer are not compatible with the second developer's changes.

In an attempt to mitigate this problem, it is known to interpose between the developers and the master database a database administrator, which imposes some order on the changes made to the master database. However, it takes time for such an administrator to perform its functions, so that a developer will be subject to a delay, before he can submit further changes to the master database.

An alternative known measure is for each developer to make a copy of the master database on his own local server. Changes are made to this local copy, then this changed local copy is compared with the master database and the various changes are then applied to the master database manually. This is time-consuming, and also prone to error.

It is desirable to be able to control in an automatic way how a database changes with regard to its various states or versions, so that any number of developers can make their own changes to the database and have these changes committed efficiently and without delay to the master database, while allowing each developer to readily update his own local copy of the database to a particular state or version.

SUMMARY OF THE INVENTION

In an embodiment of the invention, a method is provided for carrying out version-control of a database in a development environment. The development environment includes a master server storing a master database which is to be developed locally by one or more developers, one or more local servers which store a local copy of the database, a local machine for database development purposes, and a metadatabase which can be accessed by at least the local machine. The local machine has a resident program for performing the various steps of the method. The local copy may be obtained initially from the master server. In the method, the state of the local copy of the database is changed as part of a development process; under the control of the program a script is then derived based on the state change and is checked into the master server, where it is executed on the master database and stored on the metadatabase. The execution of the script on the master database changes the state of the master database to reflect the state change in the local copy of the database.

In a second embodiment, during the check-in stage the script is sent to the master server through a staging server, which helps to manage the inflow of scripts. This is helpful where a large number of developers are involved.

The metadatabase may be located on the master or local server, or remote from both of these.

Preferably a duplicate copy of the local database is provided, which acts as a reference copy. In that case, the program marks that the master copy of the database has been changed in accordance with the script, marks that the local copy of the database has been changed in accordance with the script, and executes the script on the reference copy of the database.

In a preferred embodiment, when the script is stored on the metadatabase, the program allocates an ID identifying the script, and the marking is achieved by storing the script ID in a table in the master database and in a table in the local and reference copies of the database.

The program may also store not only the script, but also a reverse script, which can be sent to, and executed by, at least one of the master server and the local server, in order to change the state of the respective master copy and local copy of the database to an earlier state. The reverse script is also executable on the reference copy of the database.

In a further variant of the invention, when the reverse script is executed on the local server, the ID relating to the script is deleted from the table in the local and reference copies of the database.

In a further variant, the metadatabase stores, for each script, script information including the version of the database, to which the script corresponds. Also stored may be, for each script, script information including at least one of: the developer responsible for the script, the time and date at which the script ID was entered into the master-database table and the time and date at which the script was executed on the master database.

In a further variant, after a plurality of scripts have been checked in, the program stores in the metadatabase script information relating to the version of the database at that point in time.

The invention also provides a method for updating a local copy of a database in the above-described database environment. The method involves obtaining a list of script ID's corresponding to all scripts executed on the master server in respect of the database before and up to a given state of the database; comparing this list with a list of script ID's stored on the local server in respect of the existing local copy of the database, thereby obtaining a list of outstanding script ID's; obtaining from the metadatabase those scripts corresponding to the list of outstanding script ID's, and executing those outstanding scripts on the local copy.

The invention allows a local database to be updated to any version of a master database. This means that the local database can be updated to the latest version of the master, or to a version later the present version of the local copy, but earlier than the latest version of the master. It is also possible to change the state of the local copy to a state earlier than its present state, i.e. to carry out a reversion.

The invention also provides a program capable of being run on a local developer's machine. The program causes the various steps set out above to be carried out in the master server, in the local server and in the metadatabase, as appropriate.

A database development environment also constitutes an aspect of the present invention. The environment includes a local machine for use by a database developer; a master server storing a master database, which is to be developed; one or more local servers capable of storing a local copy of the database, and a metadatabase, which can be accessed by at least the local machine. When a developer has made a change to the local database copy, he activates a program in his local machine, which causes a script to be derived based on the state change and causes the script to be executed on the master database, which changes the state of the master database to reflect the state change in the local copy of the database. The program also causes the script to be stored on the metadatabase.

A method for updating a target database to a predetermined version is also provided. The method involves exporting one or more scripts defining a change of state of the database up to and including the state corresponding to the predetermined version. Of those exported scripts, only those which have not yet been executed on the target database are then executed. Determining which scripts need to be executed can be done either manually by someone with knowledge of the present state of the target database, or automatically by including in the exported scripts a self-checking code. This self-checking code checks each exported script against a record on the target database of all of the scripts already executed on that database. Where the script has not already been executed, it is subsequently executed.

BRIEF DESCRIPTION OF THE DRAWINGS

Embodiments of the invention will now be described, by way of example only, with the aid of the drawings, of which.

DETAILED DESCRIPTION OF THE EMBODIMENTS

Figure 2:
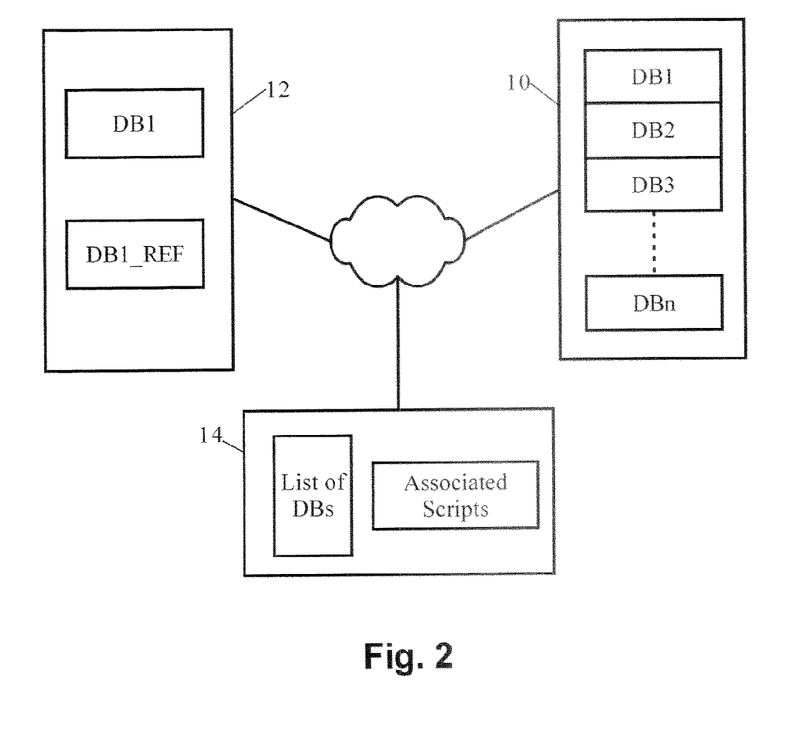
FIG. 2 is a block diagram of a database development environment employing the method according to a first embodiment of the invention.

The database version-control method according to the first embodiment will be described initially with reference to FIG. 2. FIG. 2 shows the various components employed in the method, which are: a master database server 10, a local database server 12 which is used by the developer, and a metadatabase 14. In practice, many developers may be involved, in which case each may have his own local database server. These local servers may be physically located on different machines, or even on the same machine. The developers' own machine or machines may be separate from any of the machines accommodating the local servers. Also, the metadatabase may be located on the master server, or on a separate server, which again may be on a separate machine, or on any of the developer's machines.

Figure 3:
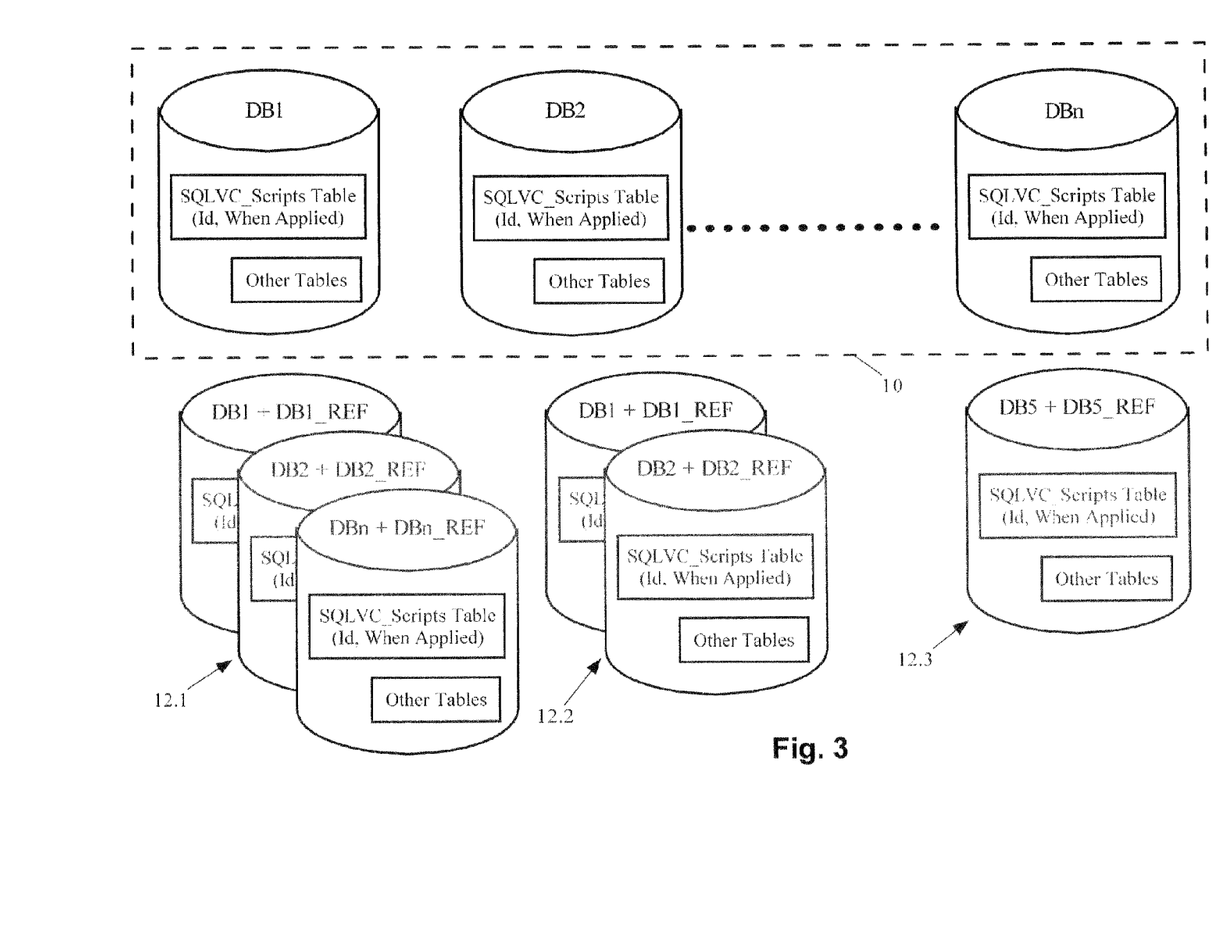
FIGS. 3 and 4 are block diagrams giving a more detailed representation of a database development environment employing the method according to a first embodiment of the present invention.

The master server 10 has stored on it the various databases available, shown as DB1 . . . DBn, along with a list of scripts, which have been applied to these databases. The metadatabase 14 keeps a list of the databases, DB1 . . . DBn, and also maintains not only a list of the scripts, but also the contents of those scripts. This arrangement is illustrated in greater detail in FIGS. 3 and 4. In FIG. 3 the master server 10 is shown as containing n master databases, DB1, DB2 . . . DBn. Each database contains a table called "SQLVC_Scripts", that stores a reference to the scripts that have been executed on that database. The reference corresponds to the scripts stored in the metadatabase 14 (see FIG. 4). In addition to the table "SQLVC_Scripts", each database includes other tables, which relate to the data and schema of the database.

The local servers 12, which will normally be used by respective developers, each have one or more databases stored on them, which will be at various states. In the case of the first local server 12.1 it can be seen that the developer on that server has been working on databases DB1, DB2 and DBn, while the developer on the second local server 12.2 has been working on DB1 and DB2, and the developer on local server 12.3 has been working on DB5 only.

Figure 4:
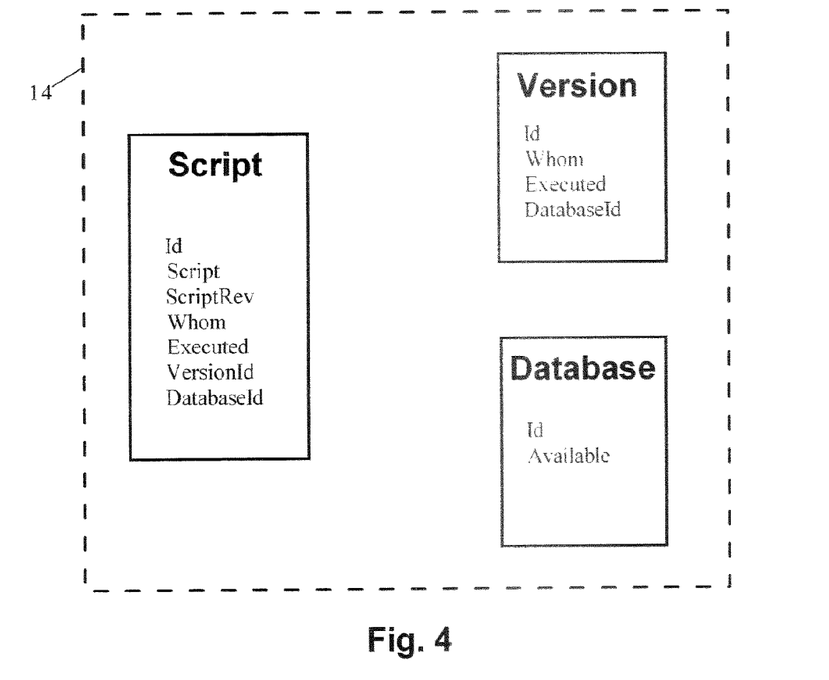

The metadatabase 14 in FIG. 4 contains at least three tables, namely a script table, a version table and a database table. Additional tables may be provided, depending on requirements. For example, a user-access table may be included, which indicates which users have right of access to the metadatabase.

The script table shown in FIG. 4 stores, for each of the databases stored in the master server 10, a list of scripts which have been checked in, and the version table stores an indication of the version at which the databases stand at any given point in time. Each script is allocated an ID (this is explained in greater detail below), which is stored in the field "Id" in the script table. This ID is simply a unique reference identifying the script in question. The script table stores not only the script ID and the contents of the script itself (shown as the "Script" field in FIG. 4), but also the contents of an equivalent reverse script, "ScriptRev", which is discussed in more detail later. Also stored in the script table is an identification of the developer responsible for the script (shown as the "Whom" field), the time and date at which it was executed on the master server (the "Executed" field), the ID of the database version ("VersionId"), with which the script is associated, and the ID of the database itself (the "DatabaseId" field).

The database table includes the ID of the database (the "Id" field) and a flag indicating whether or not the database is available to developers (the "Available" field). As regards the version table, this likewise contains an ID for the version concerned (the "Id" field), the identity of the developer responsible for generating the version (the "whom" field), the time and date at which this version was executed on the master server (the "Executed" field) and an indication of the database ID (the "DatabaseId" field). There are therefore, in this embodiment, three different ID's which are used: the script ID, the database ID and the version ID. Of these the most important is the script ID, to be explained further below.

As shown in FIG. 3, each local server 12.1, 12.2, 12.3 includes not only its own, local, copy of particular databases, e.g. DB1, DB2 and DBn in local server 12.1, but also a reference copy of the same databases. The reason for these two different copies will become apparent later.

When a developer changes a database, it will normally be the schema of the database that is changed, rather than the data, though data changes may also be made. As changes occur, the database moves from one state to another, and this change in state is expressed in the present embodiment of the invention in the form of an SQL script. It is this script which a developer will use to move the state of a local database from one state to another, desired, state. An accumulation of such scripts over time represents a record of how the database has changed from one version or state to another.

These scripts are created in sequence, as the various developers work on the same database. The present invention allows all of the developers to stay in synchronization, as well as enabling them to obtain the latest (or any other) version of the database.

Figure 5:
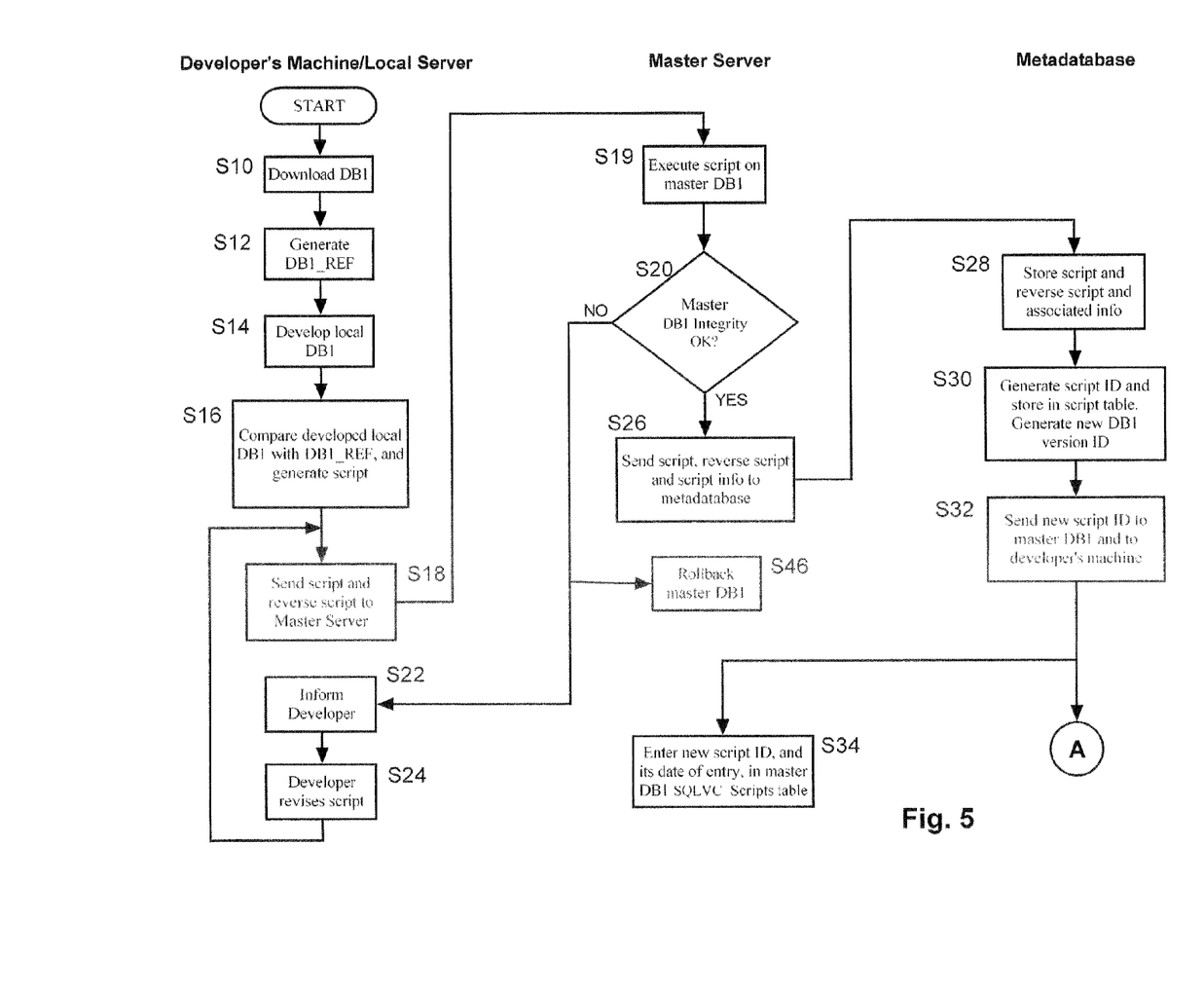
FIGS. 5 and 6 are a flowchart illustrating a part of the method according to the first embodiment of the present invention.
Figure 6:
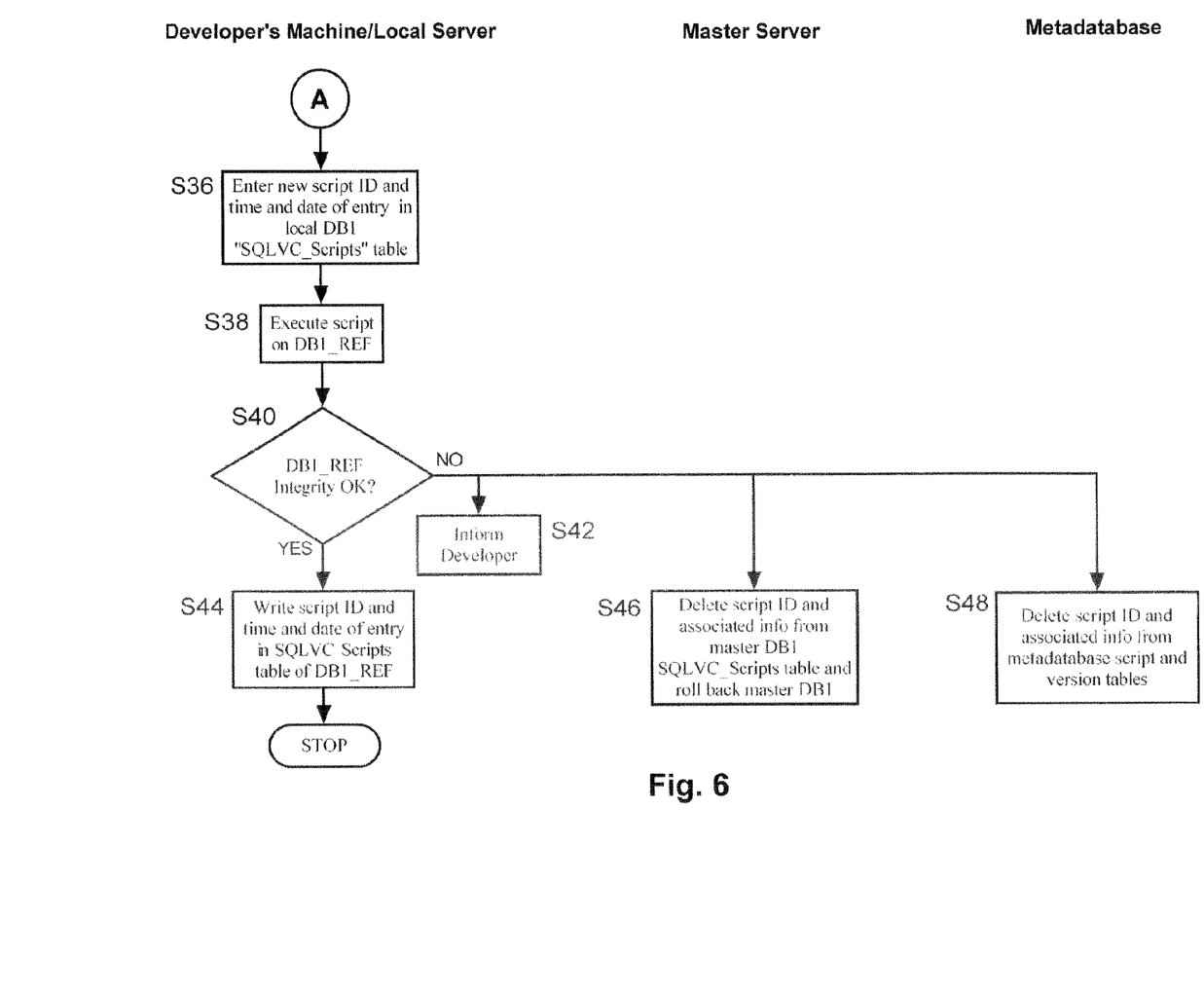

A mode of operation of the embodiment will now be described with the aid of the flowchart of FIGS. 5 and 6. In FIGS. 5 and 6 events are shown in three columns: events involving the developer's machine or local server, events involving the master server and events involving the metadatabase. As will be described in greater detail, these events are under the control of a dedicated program, which in a preferred embodiment is resident on the developer's machine. Note that, although for the sake of simplicity it has been assumed that the local server is on the developer's own machine, in practice it may be remote from the developer's machine.

A developer first of all obtains from the master server 10 a copy of a desired master database (e.g. DB1) for his own database server (step S10), assuming a copy does not already exist on his local server. In practice, he obtains two copies of DB1: one to work on (the "local copy") and a reference copy, DB1_REF. Preferably, only one of these is downloaded from the master server, the other being generated in the local server (step S12). However, the same database may instead be downloaded twice from the master server. When the developer makes changes to DB1 (step S14), he makes these changes on his local copy only, using whatever tools he prefers, not on his reference copy. When he is happy with the changes he has made, he generates an SQL script corresponding to those changes and checks that script into the master server. The check-in process will now be described with reference to FIGS. 5 and 6.

To start the check-in process, the developer performs, by means of the dedicated program which is resident on the machine that he is using, an automated schema and/or data comparison (step S16) between the changed local DB1 copy and the "clean" reference copy, DB1_REF. The result of the comparison constitutes the required script. This script is then sent, under the control of the program, to the master server (step S18), together with the corresponding reverse script, the identity of the developer or developer's machine and the ID of the relevant database, in this case DB1. The program on the developer's machine then executes the script on the master copy of DB1 in the master server (step S19). At this point the program checks to see whether or not the script will cause problems to the database (step S20). This means checking whether the script will have any knock-on effects on other items or objects in the database. Hence, as part of the checking-in process, a step may be included, in which these other objects are rebuilt, in order to confirm if they are still valid. Only if the result is positive in step S20 is the script provisionally accepted for the master server. On the other hand, if the result is negative, this is flagged up to the developer (step S22), who will then endeavour to correct the problem on his local server (step S24), after which he will check the revised script in again (step S18). Assuming the result is positive ("YES"), the program sends the script and its reverse equivalent, and also the developer or developer machine's ID and database ID, to the metadatabase (step S26), and stores both of these scripts and these two IDs in the metadatabase's script table for DB1 as "Script", "ScriptRev", "Whom" and "DatabaseId" (step S28). In addition, the program generates an identifier (ID) for the script (this same ID applies to the reverse script also), together with an ID for the new DB1 version (step S30). In one method of generating the script ID the program uses the MAC address of the network card in the developer's machine, together with the current date and time, in an algorithm which yields the unique ID. These script and version IDs are stored in the metadatabase script table, while the new version ID is also stored in the version table of the metadatabase. The allocation of a new version ID may occur after each check-in, or at the end of a development process, when several state transitions have been made—e.g. when the database is about to go into production as a particular version.

The program marks that the changes corresponding to the script have been applied to the master DB1 database. It does this by sending the new script ID to the master server (S32) and adding it as an entry to an "SQLVC_Scripts" table in DB1 on the master database. Also added is an indication of the date and time when this entry was made (S34).

The program also marks that the relevant script has been completed on the local copy of DB1. To achieve this, the program enters the new script ID into an SQLVC_Scripts table for DB1 on the local server (S36). This table is similar to the SQLVC_Scripts table forming part of the DB1 database on the master server. In addition to the script ID, the program also enters into the local server's SQLVC_Scripts table for DB1 the time and date when the script was entered into the local SQLVC_Scripts table.

The next step is to update DB1_ref to the new state, as defined by the script. To achieve this, the program executes the script on DB1_ref in step S38, after which a check is made as to the integrity of DB1_ref (S40). In practice, it is not anticipated that any problems will arise from the use of the new script on this reference database, since DB1_REF should be the same as the copy of the non-reference local copy just before the developer made the changes to that local copy. Assuming no problems are caused by the script on DB1_ref (if problems have been caused, these are flagged up to the developer in step S42), the script ID is entered into DB1_ref's own SQLVC-Scripts table, which, again, is similar to that on the master server. In addition to the script ID, the time and date of such entry are also entered into the same table (step S44).

Only when it has been confirmed that the script will not cause problems to any of the copies of DB1—i.e. to the local copy, the reference copy and the master copy—is the script assumed to be finally committed to the master server and the various pieces of information relating to the script (e.g. script ID, version ID, time and date, etc.) confirmed. Thus, in a preferred embodiment of the invention, the checking-in process is run as a single transaction. This means that, if any of the operations involved in the checking-in process fails, none of them is completed and the developer is provided with an error message, so that he can resolve the problem. In this way atomicity, which is desirable when everyday transactions are carried out on a database when in normal use, is maintained also during the developmental phase.

In FIGS. 5 and 6, final committal of the script to the master server does not take place if the result of step S20 is negative, in which case master DB1 is rolled back to its existing state before the script was created (step S46), or if the result of step S40 is negative, in which case the program deletes the script ID and ID entry time from the master DB1 SQLVC_Scripts table (S46), and deletes the script ID, the script contents Script and ScriptRev, the associated execution time on the master and the VersionID from the metadatabase script table (S48). In addition, the information in the VersionId, Whom and Executed fields of the Version table are also deleted (S48), and the master DB1 is rolled back to its previous state (S46). On the other hand, should all steps proceed without incident to the end of the flowchart, the script and reverse script and their associated information are allowed to remain in the metadatabase, the script ID and associated information are allowed to remain in the SQLVC_Scripts tables of the master DB1, local DB1 and DB1_REF, and the master DB1 and local and reference DB1s are allowed to remain in their new state. This corresponds to the final committal process for the script in question.

The above-described state-changing process is carried out also in respect of any other developers working on the same database. Thus, the local changes created by these developers are made on their own working local copies of the database they are working on (e.g. DB1), a comparison is made with their own local reference copy, which produces a script, and this script is then checked into the master database in the master server.

Note, incidentally, that, if a developer decides he does not like the changes he has made, he can discard them at any time before committal by aborting the check-in process, after which he can simply replace his local working copy with the master copy from the master server. If he has second thoughts before he has started the check-in process, he can simply replace his local copy with the still clean reference copy.

As already described, the contents of all of the scripts that are checked in by the various developers are recorded in the metadatabase 14 along with information relating to the scripts, including the identity of the relevant developer, the time and date at which the script was executed in the master server, the ID of the relevant database and database version, etc.

Figure 7:
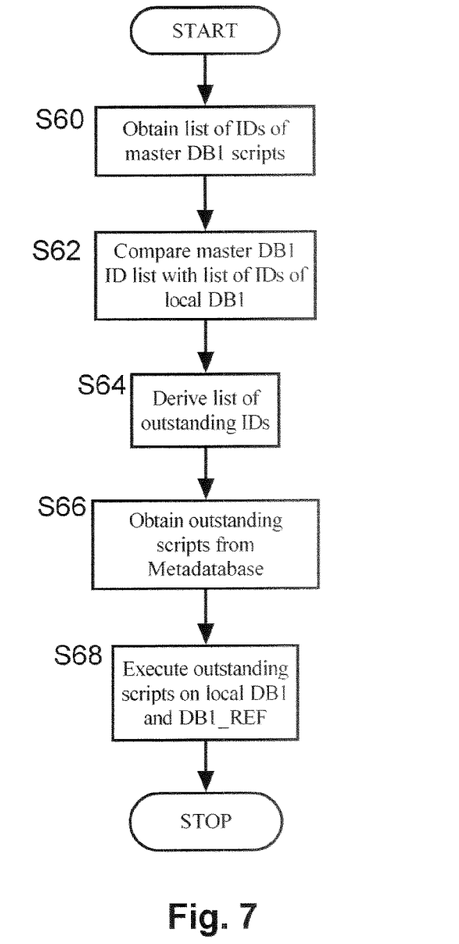
FIG. 7 is a flowchart illustrating a further part of the method according to the first embodiment of the present invention.

A second part of the inventive method is now described with reference to FIG. 7.

It is assumed that a developer already has a database (e.g. DB1) on a local server, and wishes to update it to the latest state or version present on the master server. Thus, in this situation the developer is not developing DB1 himself, but is changing its state to one already defined in the master server. He first obtains from the metadatabase, through the dedicated program on his machine, a list of all of the script ID's associated with the master DB1 (step S60). Alternatively, the program may access the master database itself for this information, which will be found in the SQLVC_Scripts table for the master DB1. The program then makes a comparison between those ID's and the ID's of the scripts which have already been executed on the local copy of DB1 (step S62). This identifies those scripts which need to be executed on this local DB1 copy (step S64) in order to bring it to the required state. The program then obtains from the metadatabase the outstanding scripts themselves (step S66), and executes them on the local copy of DB1 located on the local server (step S68). Execution of such scripts takes place in time order corresponding to the time of execution of these scripts on the master database. These same scripts are also used to update the developer's reference copy (S68).

It is clear from the above that the various steps required to check-in a new script and to update a database on a local server are carried out under the control of the special program resident on the developer's machine.

Note that the invention allows a developer to update his local database copy to a version, which is later than his local version, but not necessarily the latest version corresponding to the present state of the master database. In that case, the program obtains from the metadatabase a list of the script ID's up to that particular version. This list, as before, is compared with the list of ID's currently stored on the developer's local server, and the outstanding scripts are identified. These outstanding scripts are then downloaded from the metadatabase, and executed on the local server.

While in many cases a developer will want to update his local database copy to a state later than its present state, there are times when he will want to revert to a previous state. In other words, he may want to move his local database backwards instead of forwards. To this end, along with the normal forwards script, a reverse script (called, as already mentioned, "ScriptRev" in FIG. 4) is stored in the metadatabase 14. This reverse script, when run, is capable of reversing the operation to arrive at the previous state. After the reverse script is executed, the ID reference common to both the forward and reverse scripts is removed from the SQLVC_Scripts table of the local and reference databases.

At various points during the development phase, it will be desired to freeze development, so that a release can be made. The release identification can be identified in the metadatabase by the "version Id" field in the script table and/or the "Id" field in the version table.

Various other administrative functions may also be provided. These include: an "Edit Script" function, whereby an administrator can edit a script that has already been applied; a "Reapply Local" function, whereby a developer can force a script to be re-executed on his local database server; a "Reapply Master" function, whereby an administrator can force a script to be re-executed on the master server; a "Delete" function, whereby an administrator can delete a script from the system, even though this would not cause any changes to any of the databases; and a "Roll-Back" function, whereby an administrator can roll-back the master database to a previous state and remove all traces of the scripts that were applied after that point. It should be appreciated that these functions should be used with care, since they can create undesirable discrepancies between the master database and the corresponding working and reference databases on a local database server.

One way of achieving rollback is not to delete the ID reference to one or more unwanted scripts on the master server, but to check-in a new script, which moves the master database forward to a notionally new state, which in real terms is an old state. Thus, in this particular method, database changes are always forward-moving, even though the end-result may be a reversion to a previous state.

Figure 8:
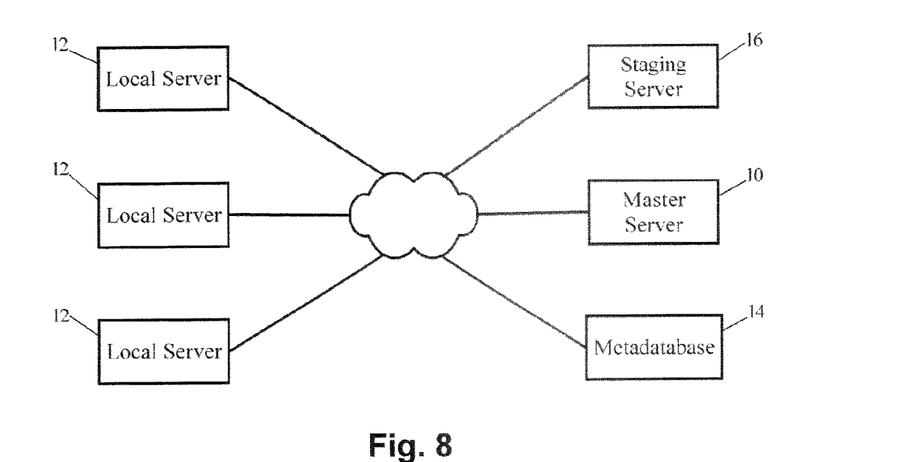
FIG. 8 is a block diagram of a database development environment employing the method according to a second embodiment of the invention.

A second embodiment of the invention is illustrated with the aid of FIG. 8. In this modified method, as with the first embodiment, each developer has access to a local database server on which he makes changes to a local copy of a database, a master copy of which is stored on a master server 10. Also, as before, script data relating to the scripts submitted by each developer are stored in a metadatabase 14. The difference with this embodiment is that the developers access the master server through a database administrator, or "staging" server 16. This can be expedient in order to vet all scripts before they are checked into the master server. Where a large number of scripts are to be checked in, the chances of errors appearing on the master database may be quite high. By having a staging server run a preliminary check on all submitted scripts, only those that are determined to be error-free can be passed on to the master server. The staging server may also be used to block very trivial changes in a database from creating unnecessary updates to the master database on the master server.

As part of the script-management process in either of the two embodiments, the invention envisages the exporting of scripts as text files, which can be run on a target database, as required. The export can contain all of the available scripts, selected scripts only, or a single script associated with a particular database version.

Figure 9:
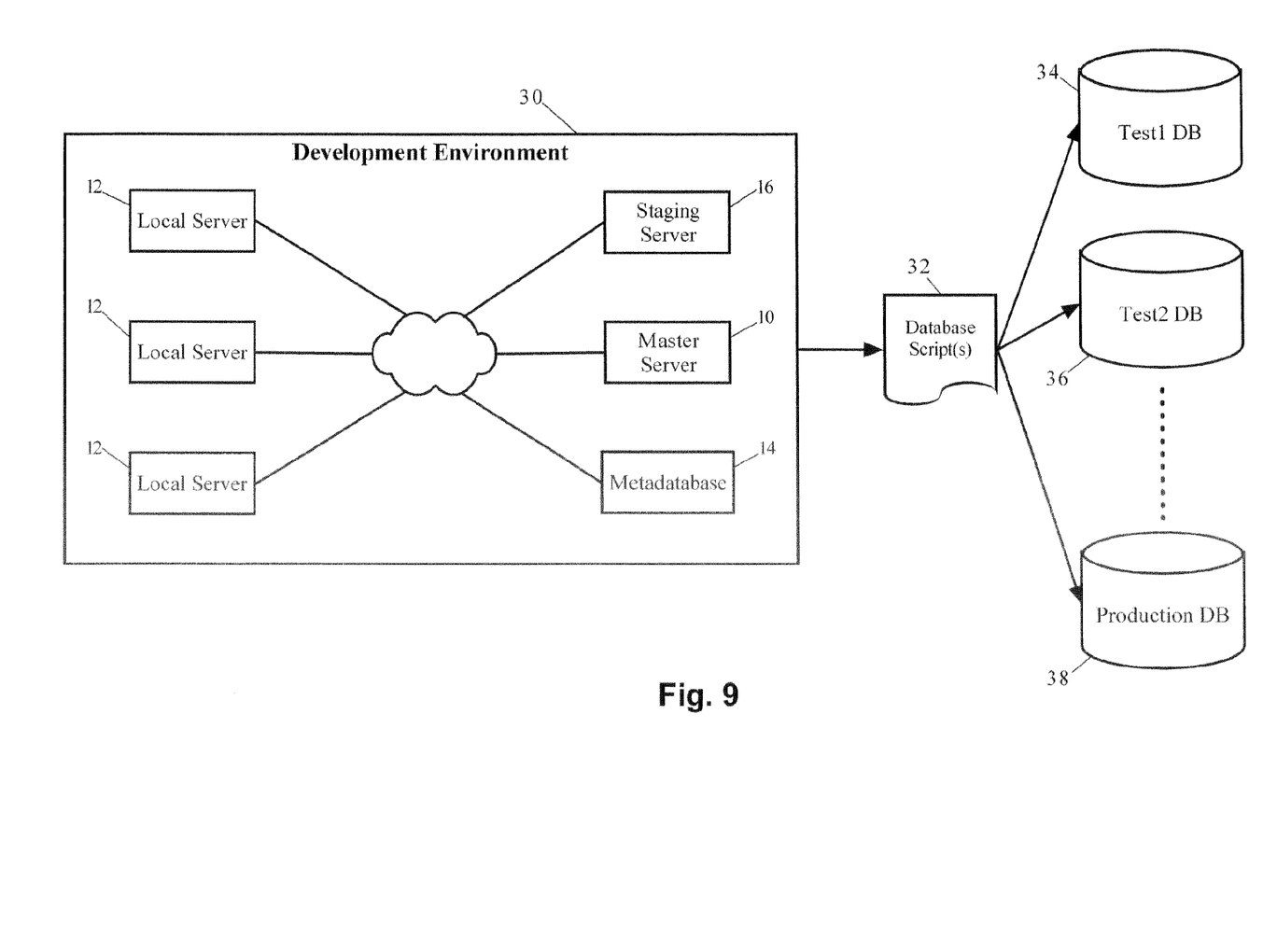
FIG. 9 is a block diagram of a database environment involved in the updating of a target database.

FIG. 9 illustrates an embodiment of this aspect of the invention. FIG. 9 includes at the left-hand side a development environment 30, which is identical to the environment illustrated in FIG. 8, and therefore allows for the inclusion of a staging server. Scripts resulting from the checking-in process described earlier are extracted as database scripts 32 relating to one or more particular databases, and these are then applied either manually, or by an automated process, to the target database(s) requiring to be updated. In FIG. 9 these target databases comprise one or more of a number of test databases 34, 36 and a production database 38.

Figure 10:
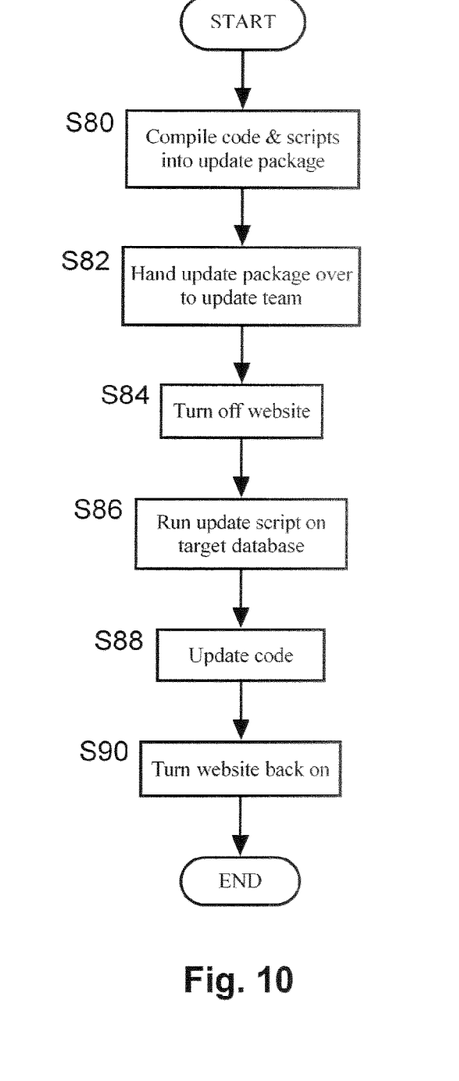
FIG. 10 is a flowchart illustrating a specific example of the updating of a target database.

A practical example of such an updating scenario is the updating of a website application. The steps involved in this might take the simplified form shown in FIG. 10. Firstly, someone with access to the database environment 100, most likely a developer, compiles all code and scripts relating to the application (step S80) and hands the resulting update package to someone having access to the website (step S82). At least the compiling of the scripts can be performed using the above-mentioned program resident on the developer's machine. That person turns off the website (S84) and runs the update package. This occurs in two parts. Firstly, the update script(s) is/are run on the relevant database (S86), then, secondly, the code is updated (S88). Finally, in step S90 the website is turned back on.

The exporting and execution of the scripts on the target database can be done in two different ways. The first way is to export only those scripts which are required for the updating process. This relies on the person doing the exporting being aware of which scripts have already been run on the target database. The advantage, on the other hand, is that no extra information is needed on target database. The second way is to include self-checking code in the exported scripts, in order to check which scripts have already been applied to the target database. This has the advantage that no prior knowledge is needed as to which scripts have already been applied, but instead all of the scripts for that database can be exported. The drawback, however, is that the target database will require a record of those scripts already applied. This means, in practice, installing, e.g., an SQLVC_Scripts table on the target database, which will maintain a record of the executed scripts. The self-checking code thus ascertains from the target SQLVC_Scripts table whether or not a particular script has already been executed on the target database and, if not, the script is executed on the target database. The self-checking code can be generated using the developer's resident program.

It should be noted again that the exported script files are essentially merely text files, which can be carried around on disk or flash drive, or sent out by e-mail. They are then executed on the target database by any method preferred by the installer.

What have been described are embodiments of the invention, which allow the various states in the development of a database to be automatically managed, in such a way that a developer can readily update a database to a later version, or on the contrary revert to a previous version, without the need to reconstruct the whole database from scratch.

This is achieved, in broad terms, through the use of scripts (nominally SQL), which are derived by a dedicated program on the developer's machine via a comparison step described above. The program checks these scripts in, either directly or indirectly via a staging server, to a master database server. The master server uses each script to update a master copy of the database and, if no problems arise from the use of the script, stores the script in a metadatabase. The master database and the local and reference copies of this database are marked via their respective SQLVC_Scripts tables to indicate the script responsible for the change of database state. The scripts are an expression of the incremental changes made to a local copy of the database on the local database server.

The invention handles all changes to a particular database made by any number of developers, such that proper housekeeping is carried out, whereby at any one time a developer can have confidence that the master database, which is stored on the master server, is stable and reflects the latest state of the database. Furthermore, all incremental changes to the database are stored in one convenient place, the metadatabase, in the form of individual scripts. These scripts are referenced to the relevant database, the relevant developer, the relevant version number of the database, etc., so that a developer can readily move his own local copy of the database to a given version simply by requesting the metadatabase for a list of the relevant scripts up to that version. This may or may not be the latest version.

Scripts can also be exported, e.g. in the form of text files, in order to bring the state of a production server up to a required version.

In this specification the terms "state" and "version" have been used more or less interchangeably. Thus, a new version of a database will necessarily define a new state of the database. However, in some situations it may be desirable to differentiate between these two terms. This is particularly the case where a version designation (version ID) is only allocated once a database has achieved a particular state. Thus, between consecutive versions, a database may go through a number of intermediate states.

Although the invention in its embodiments has been described as employing at least three tables in the metadatabase, in practice two or even all three of these may be combined into a single table. Furthermore, although the scripts have been assumed to be SQL scripts, in practice a different language may be employed for the scripts. Still further, it has been assumed that the program responsible for carrying out the various steps of the above-described method is software accommodated exclusively on the developer's machine. However, it is possible to employ a distributed arrangement, in which different modules of the program are accommodated on different machines.

In the above-described embodiments the script IDs were entered into an SQLVC_Scripts table on the master server and on the local server(s) and production server, where applicable. However, this is not absolutely essential, and instead it might be made the responsibility of an administrator to keep track of the various scripts as they are checked in, and to determine which scripts have not yet been executed on the various databases (cf. the script exporting aspect described above).

Figure 11:
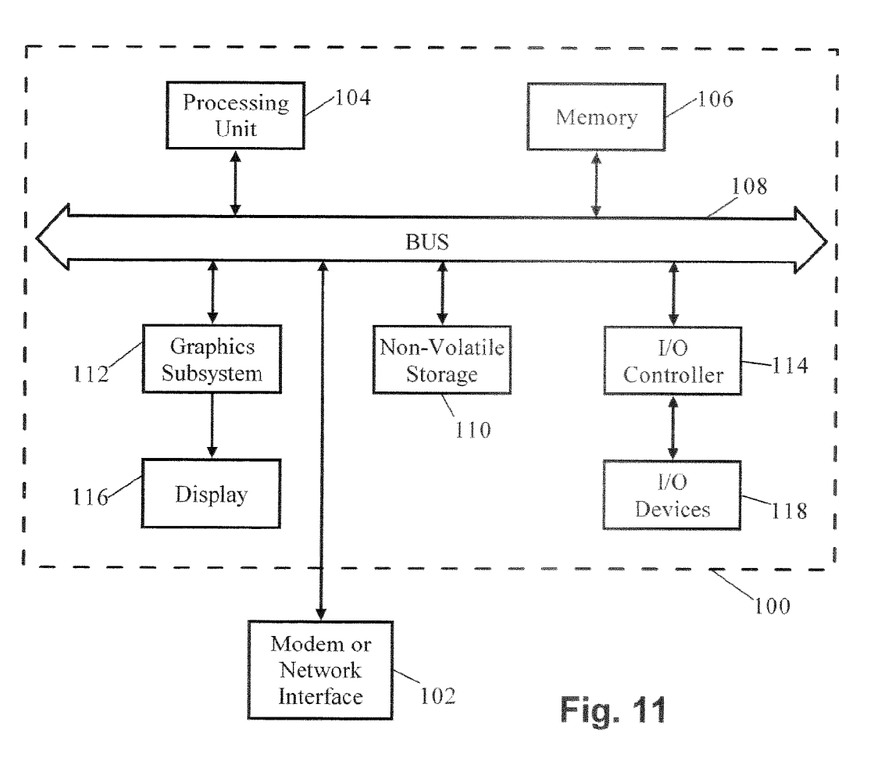
FIG. 11 is a block diagram illustrating a typical constitution of a machine, which may be used by a developer and may also be used as the master server and/or the local and test/production servers.

Finally, FIG. 11 illustrates an exemplary embodiment of a computer system 100, in which a machine, as used by a developer, may be realized. Computer system 100 may form part of a desktop computer or a laptop computer, or any similar computer device.

The computer system 100 may interface to external systems through a modem or network interface 102, such as an analog modem, ISDN modem, cable modem, token ring interface, or satellite transmission interface. As shown in FIG. 6, the computer system 100 includes a processing unit 104, which may be a convention microprocessor, such as an Intel Pentium microprocessor, an Intel Core Duo microprocessor, or a Motorola Power PC microprocessor, which are known to one of ordinary skill in the computer art. System memory 106 is coupled to the processing unit 104 by a system bus 108. System memory 106 may be a DRAM, RAM, static RAM (SRAM) or any combination thereof. Bus 108 couples processing unit 104 to system memory 106, to non-volatile storage 110, to graphics subsystem 112 and to input/output (I/O) controller 114. Graphics subsystem 112 controls a display device 116, e.g. a cathode ray tube (CRT) or liquid crystal display, which may be part of the graphics subsystem 112. The I/O devices 118 may include one or more of a keyboard, disk drives, printers, a mouse, a touch screen and the like as known to one of ordinary skill in the computer art.

Where the described computer system 100 is employed as a developer's machine, the earlier-described program, which carries out the various steps involved in the embodiments of the invention, will normally be stored on the non-volatile storage 110. Thus, it may be stored on the machine's hard drive, or possibly on an externally connectable storage medium, such as a USB memory stick or a CD. These two devices would then constitute part of the I/O devices shown as item 118 in FIG. 11.

The local server(s) 12 will often form part of the computer system 100, in which case the local copy and reference copy of a database may be stored in the non-volatile storage 110. However, where the local server is external to the developer's own machine, this machine (computer system 100) will communicate with the local server, and also with the master server and metadatabase, via the network interface 102.

The master server and local servers, where these do not form part of the developer's own machine, may also each be realized as a computer system such as that shown in FIG. 11. However, this system may be headless, since it need only have a serving function. In that case, items such as the graphics subsystem 112, the display 116, the I/O controller 114 and the I/O devices 118 may be absent.

The foregoing description of illustrated embodiments of the present invention, including what is described in the Abstract, is not intended to be exhaustive or to limit the invention to the precise forms disclosed herein. While specific embodiments of the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

The invention claimed is:

1. A method for carrying out version-control of a database in a development environment including a master server storing a database to be developed, the database on the master server constituting a master database; one or more local servers storing a local copy of the database; a local machine, upon which database development can be performed; and a metadatabase, which can be accessed by at least the local machine; the method comprising:
    obtaining the local copy of the database from the master server;
    providing a duplicate copy of the local copy in the local server, the duplicate copy constituting a reference copy of the database;
    changing a state of the local copy of the database as part of the development process;
    deriving a script based on the state change;
    executing the script on the master database, thereby changing the state of the master database to reflect the state change in the local copy of the database;
    storing the script on the metadatabase; and
    storing a reverse script on the metadatabase in addition to the script, wherein reverse script can be executed on at least one of the master server and the local server to change the state of the respective master copy and local copy of the database to an earlier state, wherein
    the master server is marked to show that the master copy of the database has been changed in accordance with the script,
    the local server is marked to show that the local copy of the database has been changed in accordance with the script,
    the script is executed on the reference copy of the database,
    an ID is allocated to the script when the script is stored on the metadatabase, the ID identifying the script, and
    the marking is achieved by storing the script ID in a table in the master database and in a table in the local and reference copies of the database.

2. The method of claim 1, wherein:
the metadatabase is located on the master server.

3. The method of claim 1, wherein:
the metadatabase is located on a local server.

4. The method of claim 1, wherein:
the reverse script is executable on both the local copy and the reference copy of the database.

5. The method of claim 4, wherein:
when the reverse script is executed on the local server, the ID relating to the script is deleted from the table in the local and reference copies of the database.

6. The method of claim 1, wherein:
for each script, there is stored in the metadatabase script information including the version of the database to which the script corresponds.

7. The method of claim 6, wherein:
for each script, there is further stored in the metadatabase script information including at least one of: the developer responsible for the script, the time and date at which the script ID was entered into the master-database table and the time and date at which the script was executed on the master database.

8. The method of claim 1, wherein:
after a plurality of scripts have been executed on the master database, there is stored in the metadatabase script information relating to the version of the database at that point in time.

9. The method of claim 1, wherein:
a staging server is included between the local database server and the master server,
the script is sent from the local database server to the staging server, and
the staging server passes on the script to the master server only if predetermined conditions are met.

10. The method of claim 1, further comprising:
updating a local copy of a database, the updating comprising:
obtaining a list of script ID's corresponding to all scripts executed on the master server in respect of that database before and up to a given version of that database;
comparing this list with a list of script ID's stored on the local server in respect of the existing local copy of that database, thereby obtaining a list of outstanding script ID's;
obtaining from the metadatabase those scripts corresponding to the list of outstanding script ID's, and
executing those outstanding scripts on the local copy of the database.

11. The method of claim 10, wherein:
the version, to which the local copy of the database is to be updated, corresponds to the latest version of the database.

12. A non-transitory machine-readable storage medium storing instructions, which when executed cause a local machine in a database development environment to perform a method, the database development environment including a master server storing a database, which is to be developed, the database on the master server constituting a master database; one or more local servers capable of storing a local copy of the database; a local machine, upon which database development can be performed, and a metadatabase, which can be accessed by at least the local machine; the method comprising:
following a change made in the local copy of the database as part of the development process:
obtaining the local copy of the database from the master server;
providing a duplicate copy of the local copy in the local server, the duplicate copy constituting a reference copy of the database;
deriving a script based on the state change;
executing the script on the master database, thereby changing the state of the master database to reflect the state change in the local copy of the database;
storing the script on the metadatabase; and
storing a reverse script on the metadatabase in addition to the script, wherein reverse script can be executed on at least one of the master server and the local server to change the state of the respective master copy and local copy of the database to an earlier state, wherein
the master server is marked to show that the master copy of the database has been changed in accordance with the script,
the local server is marked to show that the local copy of the database has been changed in accordance with the script,
the script is executed on the reference copy of the database,
an ID is allocated to the script when the script is stored on the metadatabase, the ID identifying the script, and
the marking is achieved by storing the script ID in a table in the master database and in a table in the local and reference copies of the database.

13. The non-transitory machine-readable storage medium of claim 12, wherein:
one or more of the local servers forms part of the local machine.

14. The non-transitory machine-readable storage medium of claim 12, the method further comprising:
updating a local copy of a database, the updating comprising:
obtaining a list of script ID's corresponding to all scripts executed on the master server in respect of that database before and up to a given version of that database;
comparing this list with a list of script ID's stored on the local server in respect of the existing local copy of that database, thereby obtaining a list of outstanding script ID's;
obtaining from the metadatabase those scripts corresponding to the list of outstanding script ID's, and
executing those outstanding scripts on the local copy of the database.

15. A database development environment, comprising:
a local machine for use by a database developer;
a master server storing a database, which is to be developed, the database on the master server constituting a master database; and
one or more local servers capable of storing a local copy of the database, and a metadatabase, which can be accessed by at least the local machine;
the local machine being provided with a program configured to cause to be performed, following a change made in the local copy of the database:
obtaining the local copy of the database from the master server,
providing a duplicate copy of the local copy in the local server, the duplicate copy constituting a reference copy of the database,
deriving a script based on the state change,
executing the script on the master database, thereby changing the state of the master database to reflect the state change in the local copy of the database, and
storing the script on the metadatabase; and
storing a reverse script on the metadatabase in addition to the script, wherein reverse script can be executed on at least one of the master server and the local server to change the state of the respective master copy and local copy of the database to an earlier state, wherein
the master server is marked to show that the master copy of the database has been changed in accordance with the script,
the local server is marked to show that the local copy of the database has been changed in accordance with the script,
the script is executed on the reference copy of the database,
an ID is allocated to the script when the script is stored on the metadatabase, the ID identifying the script, and
the marking is achieved by storing the script ID in a table in the master database and in a table in the local and reference copies of the database.

16. The database development environment of claim 15, wherein:
one or more of the local servers forms part of the local machine.

17. The database development environment of claim 15, the program being further configured to cause to be performed:
an updating of a local copy of a database, the updating comprising:

obtaining a list of script ID's corresponding to all scripts executed on the master server in respect of that database before and up to a given version of that database;

comparing this list with a list of script ID's stored on the local server in respect of the existing local copy of that database, thereby obtaining a list of outstanding script ID's;

obtaining from the metadatabase those scripts corresponding to the list of outstanding script ID's, and executing those outstanding scripts on the local copy of the database.

* * * * *